(12) United States Patent
Sunwoo et al.

(10) Patent No.: US 7,401,504 B2
(45) Date of Patent: Jul. 22, 2008

(54) METHOD OF DETECTING START OF COMBUSTION IN DIESEL ENGINES USING IN-CYLINDER PRESSURE

(75) Inventors: Myoungho Sunwoo, Seongnam-si (KR); Kangyoon Lee, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 11/642,288

(22) Filed: Dec. 19, 2006

(65) Prior Publication Data

US 2007/0204682 A1    Sep. 6, 2007

(30) Foreign Application Priority Data

Mar. 3, 2006  (KR) ............... 10-2006-0020240

(51) Int. Cl.
*G01M 15/00* (2006.01)
(52) U.S. Cl. .................................. 73/117.3
(58) Field of Classification Search ............... 73/112, 73/115, 116, 117.2, 117.3, 118.1
See application file for complete search history.

(56) References Cited

U.S. PATENT DOCUMENTS

| | | | | |
|---|---|---|---|---|
| 6,598,468 | B2 * | 7/2003 | Zur Loye et al. ............ | 73/117.3 |
| 2003/0010101 | A1 * | 1/2003 | Zur Loye et al. ............ | 73/116 |
| 2007/0186905 | A1 * | 8/2007 | Caretta et al. ............ | 123/435 |

OTHER PUBLICATIONS

Jennische, Mats: "Closed-Loop Control of Start of Combustion in a Homogeneous Charge Compression Ignition Engine", Mar. 18, 2003, cover sheet and pp. 3-4.

Leonhardt, Steffen: "Methods for Engine Supervision and Control Based on Cylinder Pressure Information", *IEEE/ASME Transactions on Mechatronics*, vol. 4, No. 3, Sep. 1999, pp. 235-237.

Heywood, John B: "Engine Operating Characteristics, Chapter 15,5.2 Fuel-Injection Parameters", *Internal Combustion Engine Fundalmentals*, 1988, pp. 863-864.

Glavmo, Magnus; Spadafora, Peter; Bosch, Russell: "Closed Loop Start of Combustion Control Utilizing Ionization Sensing in a Diesel Engine" *SAE Technical Paper Series*, 199-01-0549, Mar. 1999, cover page and pp. 1-3.

(Continued)

*Primary Examiner*—Eric S McCall
(74) *Attorney, Agent, or Firm*—Frommer Lawrence & Haug LLP; Ronald R. Santucci (57) ABSTRACT

Disclosed herein is a method of estimating the start of combustion (SOC) in a diesel engine using a difference between an in-cylinder combustion pressure and a motoring pressure so as to effectively control the combustion in a combustion chamber. The method of the present invention features that it comprises the steps of: detecting a DP value defined as a difference pressure between an in-cylinder combustion pressure and a motoring pressure; detecting a crank angle ($CA_{DPxx}$) at a point where the detected DP value equals a specific pressure; defining an angle difference between the start of combustion (SOC) and the crank angle ($CA_{DPxx}$) as a detected delay angle ($\Delta CA_{DD}$) and determining the detected delay angle ($\Delta CA_{DD}$) through an experiment of measuring the start of combustion (SOC) and the crank angle ($CA_{DPxx}$); and detecting the SOC using the following Equation: $SOC = CA_{DPxx} - \Delta CA_{DD}$, whereby the SOC can be estimated simply and accurately, and that the detected delay angle ($\Delta CA_{DD}$) is defined as a simple function for the engine speed.

2 Claims, 6 Drawing Sheets

OTHER PUBLICATIONS

Lee, Kangyoon; Yoon, Maru; Sunwoo, Myoungho: "Detection and control of SOC for CRDI diesel engines", Presentation 103, 20056105, pp. 1-3 (of 6) only.

Lee, Kangyoon: thesis for a doctorate, 2005, pp. 91-103.

Yoon, Maru: thesis for a doctorate, 2006, pp. 81-97.

* cited by examiner

Fig 1

PRIOR ART

Fig 2

PRIOR ART

METHOD OF DETECTING START OF COMBUSTION IN DIESEL ENGINES USING IN-CYLINDER PRESSURE

CROSS-REFERENCE TO RELATED APPLICATIONS

This application claims the benefit under 35 U.S.C. §119(a) of Korean Patent Application No. 10-2006-0020240, filed in the Korean Intellectual Property Office on Mar. 3, 2006, the entire disclosure of which is incorporated herein by reference.

BACKGROUND OF THE INVENTION

1. Field of the Invention

The present invention relates to a method of detecting a start of combustion (SOC) in a diesel engine using a pressure inside a combustion chamber (hereinafter, referred to as "in-cylinder pressure"), and more particularly to a method of estimating the start of combustion (SOC) in the diesel engine using a difference between an in-cylinder combustion pressure and a motoring pressure (i.e., a pressure inside a cylinder at a cycle where combustion does not occur) so as to effectively control the combustion in a combustion chamber.

2. Background of the Related Art

Figure 1:
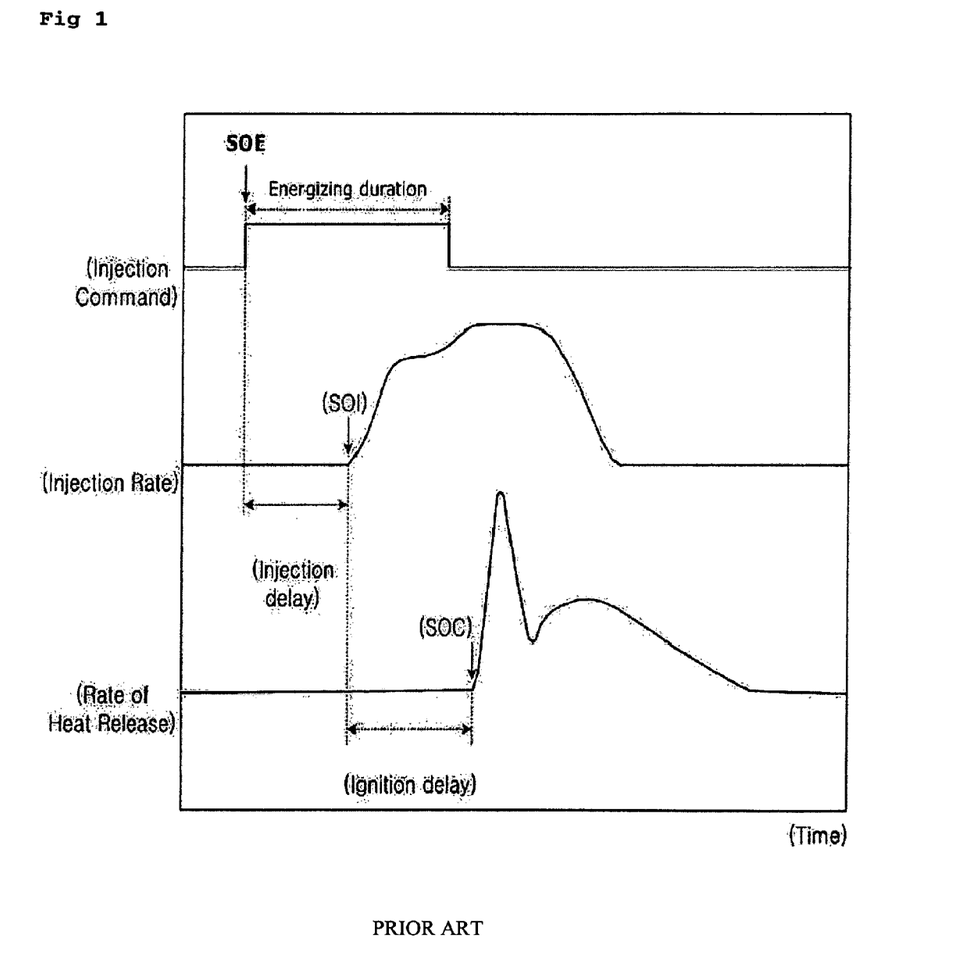
FIG. 1 is a graph illustrating a change in injection command, injection rate and rate of heat release (ROHR) in a combustion chamber over time in a diesel engine according to the prior art.

FIG. 1 is a graph illustrating a change in injection command, injection rate and rate of heat release (ROHR) in a combustion chamber over time in a diesel engine according to the prior art.

As shown in FIG. 1, a start of energizing (hereinafter, referred to as "SOE") is obtained by defining a point of time when a command is issued to a solenoid of an injector or a piezo-actuator from an engine management system (EMS) on the basis of a crank angle.

Also, a start of injection (hereinafter, referred to as "SOI") is obtained by defining a point of time when a nozzle of the injector is actually opened to inject fuel into a combustion chamber of an internal combustion engine on the basis of a crank angle, and the start of combustion (SOC) is obtained by defining a point of time when the quantity of heat corresponding to 1% of the total amount of heat released is released on the basis of a crank angle.

In this case, the time interval between the SOE and the SOI is defined as an injection delay, and the time interval between the SOI and the SOC is defined as an ignition delay.

In this regard, fuel injected is vaporized and mixed with air during the ignition delay time interval so as to be decomposed into a new chemical component that induces self-ignition.

Therefore, the SOC is determined by the relation of SOC, SOE, injection delay and ignition delay.

The SOC is generally known as having an effect on the overall performance of the engine.

That is, in case where the combustion early starts prior to a top dead center (TDC) position of a piston in the engine cylinder, the combustion pressure sharply increases to thereby prevent the piston from upwardly moving to the TDC position, which results in a deterioration of combustion efficiency and an increase of the engine operating sound generated.

In this case, the combustion must be completed before an exhaust valve is opened for the purpose of improvement of combustion efficiency and reduction of toxic exhaust emissions.

Figure 2:
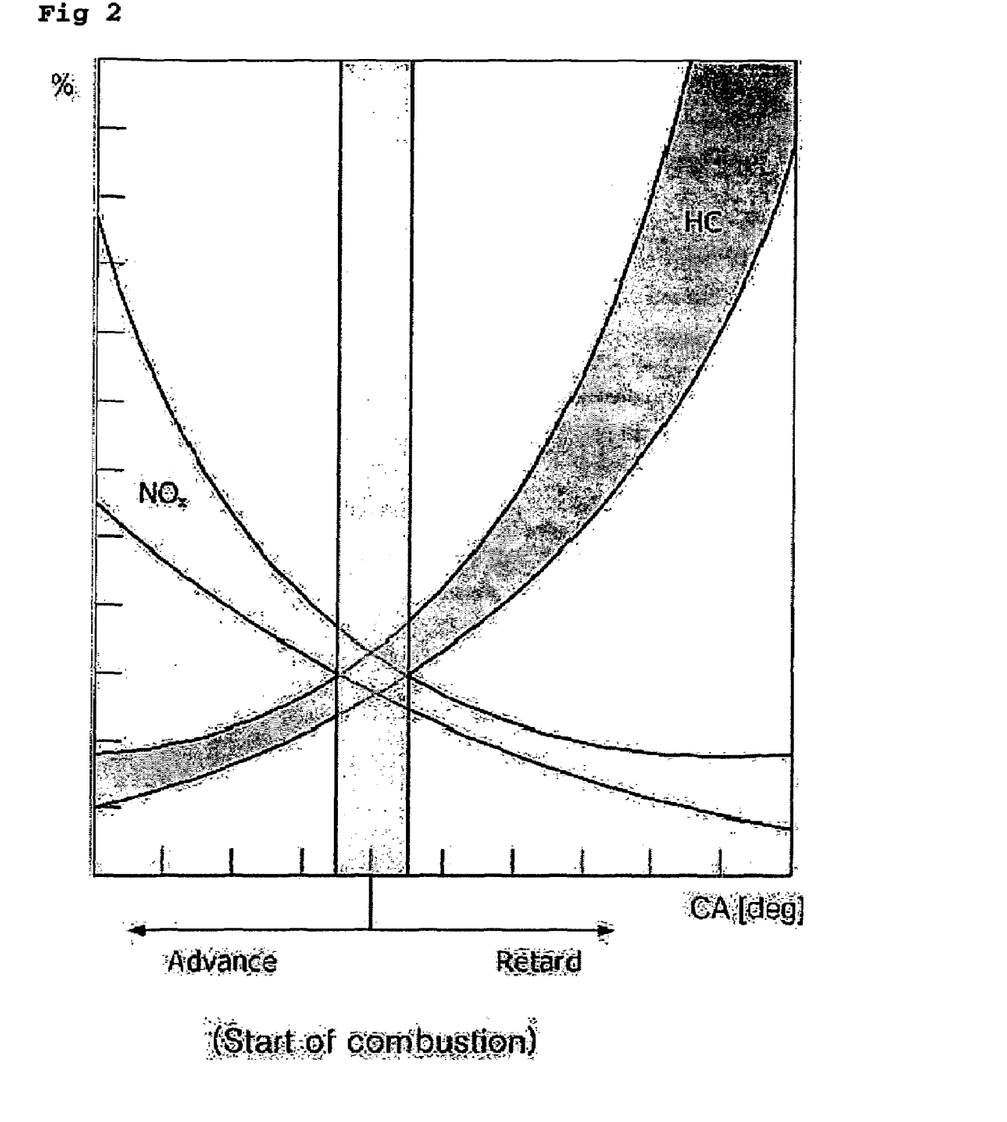
FIG. 2 is a graph illustrating the relationship between a variation of the SOC and the amount of NOx/HC emissions of a diesel engine.

FIG. 2 is a graph illustrating the relationship between a variation of the SOC and the amount of NOx/HC emissions of a diesel engine.

As shown in FIG. 2, in case where the timing of the SOC is advanced, the maximum combustion temperature increases to increase the amount of NOx emissions into the atmosphere, whereas in case where the timing of the SOC is retarded, the combustion is not completed prior to the opening of the exhaust valve. As a result, a large quantity of unburned hydrocarbon (UHC) is produced.

In addition, since a mixing quality of the air-fuel mixture depends on the SOC, it affects the generation of soot as a byproduct of incomplete combustion.

As such, since the amount of HC and NOx emissions has a tendency of being inversely proportional to each other depending on the timing of the SOC, an optimal SOC value for all the operating conditions must be maintained in order to concurrently reduce the amount of HC and NOx emissions under all the operating conditions.

Almost all the mass-produced diesel engine fuel injection systems, which are controlled under a feed-forward SOC control scheme, are generally designed to perform a basic control strategy in which combustion efficiency and engine power increase in a full load condition and the amount of toxic exhaust emissions decreases in a part load condition.

However, since the existing diesel engine fuel injection systems do not measure an actual SOC, the SOC is controlled indirectly through the control of the SOE, but not controlled directly. Thus, although an appropriate SOE is determined upon the mass-production of the fuel injection systems, when an unexpected change occurs in the injection delay time and the ignition delay time, the timing of the SOC is not controlled at a desired point of time.

Since the injection delay time varies depending on a production tolerance of an injector, a rail pressure, etc., and the ignition delay time varies depending on the amount of diesel fuel used, the temperature of intake air introduced into each individual combustion chamber, compression ratio, etc., a look-up table is mainly used to compensate for the variations of the injection delay time and the ignition delay time and numerous experiments are required to write the look-up table.

Further, in such a feed-forward control, viscosity of fuel injected or design tolerance, aging of the engine and injector components, etc., cause a variation in the SOI or the SOC, resulting in making it impossible to further accurately control the SOC by using a fixed SOE look-up table.

Nevertheless, the range of permissible tolerances can be controlled strictly to alleviate the above problem upon the production of the injector, but a precise production process is required and hence the production efficiency decreases and the manufacturing cost increase. Moreover, the feed-forward SOC control cannot compensate for cylinder-by-cylinder and cycle-by-cycle variations in the injection delay time and the ignition delay time.

Accordingly, a variation in the both delay times must always be compensated for an accurate fuel injection system. To this end, a feedback SOC control and an accurate SOC measurement or estimation is needed.

In this regard, there have been proposed various methods of detecting the SOC in a diesel engine.

The SOI shown in the graph of FIG. 1 can be identified by measuring a lift displacement of an injector needle. However, this method entails a problem in that the manufacturing cost and complexity of the injection system increases to cause a deterioration of durability. Also, since such a method is aimed at detecting the SOI, but not detecting the SOC directly associated with the performance and exhaust emission quality of the actual engine.

Alternatively, in order to directly detect the SOC, there have been proposed and used an optical combustion timing sensor for detecting the SOC using the intensity of light of a flame burnt, an SOC sensor for detecting the SOC based on an ionization technique, i.e., a method of detecting the SOC using the strength of ionization current generated during the combustion, etc.

However, the direct detection method of the SOC using the optical combustion timing sensor and the SOC sensor based on the ionization technique embraces problems in that sampling performance and durability of the sensors are deteriorated due to contaminants such as soot generated in the diesel engine, thereby decreasing accuracy of the sensors in long-term use of the sensors. Furthermore, the both sensing methods also have a problem in that a sampling area is restricted around the tip of the sensors, so that all the areas within the combustion chamber of the diesel engine cannot be covered.

In the meantime, there is proposed a method of directly estimating the SOC through information on the pressure inside the combustion chamber or the cylinder, such as analysis of released heat as an alternative method of estimating the SOC.

But, since the heat release analysis based on a law of thermodynamics is very complicated mathematically as well as employs a very low reference value level (1%), it is susceptible to a noise. In order to compensate for this, the analysis of the heat release employs an average value of pressure signals generated during several tens of cycles, and hence has a slow response speed.

In order to improve the response speed estimated in such a method, there is proposed a method of defining the SOC as a point of time when 50% of mass of a mixture of fuel and air is burnt on the basis of a crank angle.

Such a method is robust to a noise so that a response speed is relatively high as compared to the SOC estimation method using the heat release analysis, but has a problem in that a calculation process is still complicated and the relationship is not consistent between the SOC and a crank angle corresponding to the combustion of 50% of mass of a mixture of fuel and air, so that there exists a difference between an actual SOC and an estimated SOC.

In addition, as another alternative approach of estimating the SOC, a research has been conducted on an SOC estimation method using the location of the center of gravity (CG) of a difference pressure (hereinafter, referred to as "DP"). Here, the DP is defined as a difference between the in-cylinder combustion pressure and the motoring pressure.

However, the above SOC estimation method using the coordinates of the center of gravity (CG) of the DP is used for the purpose of on-board diagnosis (OBD) but not control since a deviation of the estimated SOC is considerably large.

There is therefore a need for a method in which the SOC is practically estimated more accurately and simply and a response speed is sufficiently high enough to be applicable in real time.

However, the above-mentioned conventional techniques such as the measurement of the SOC using the optical combustion timing sensor or the ionization current SOC sensor, the estimation of the SOC using the heat release analysis encounter a problem in that sufficient accuracy and speed cannot be obtained for the purpose of the feedback control in the detection of the SOC.

SUMMARY OF THE INVENTION

Accordingly, an aspect of exemplary embodiments of the present invention has been made to solve the aforementioned problems occurring in the prior art, and it is an object of the present invention to provide a method of detecting a start of combustion (SOC) in a diesel engine using an in-cylinder pressure, in which the SOC is detected more simply and a response speed is sufficiently high enough to be applicable in real time, and in which the detected SOC can be used for a feedback control of the SOC so that an optimal SOC can be maintained so as to concurrently reduce the amount of HC and NOx emissions under all the operating conditions of the diesel engine.

To accomplish the above object, according to one aspect of exemplary embodiments of the present invention, there is provided a method of detecting a start of combustion (SOC) in a diesel engine using an in-cylinder pressure, comprising the steps of:

i) detecting a DP value defined as a difference pressure between an in-cylinder combustion pressure and a motoring pressure;

ii) detecting a crank angle (hereinafter, referred to as "$CA_{DPxx}$") at a point where the detected DP value equals a specific pressure;

iii) defining an angle difference between the start of combustion (SOC) and the $CA_{DPxx}$ as a detected delay angle ($\Delta CA_{DD}$) and determining the detected delay angle ($\Delta CA_{DD}$) through an experiment of measuring the start of combustion (SOC) and the crank angle ($CA_{DPxx}$); and iv) detecting the SOC using the following Equation:

$$SOC = CA_{DPxx} - \Delta CA_{DD}.$$

In a preferred embodiment of the present invention, the detected delay angle ($\Delta CA_{DD}$) is defined as the following Equation:

$$\Delta CA_{DD}(N) = k_0 N^2 + k_1 N + k_2$$

where N is the revolution per minute of the engine, and $k_0$, $k_1$, and $k_2$ are arbitrary numbers for representing the relationship between N and $\Delta CA_{DD}$.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to a preferred embodiment of the present invention with reference to the attached drawings.

The present invention features that there is proposed a novel method of detecting the SOC in a diesel engine.

The reason why a $CA_{DPxx}$ is employed in the detection of the SOC is as follows.

There are many variables affecting the SOC of the engine, but it is difficult to accurately detect the SOC due to a lot of factors such as a noise, a change of the operating condition, a variation of the combustion property, etc. Thus, the selection of variables for detection of the SOC requires that (a) the variables should be easy to measure and calculate, (b) the variables should be robust to external factors, and (c) the variables should be in close relation to the SOC so as to detect the SOC more accurately. A variable satisfying these requirements is a crank angle ($CA_{DPxx}$).

As a result of calculating the DP depending on various SOE values, the opening/closing of waste gate, and the injection period of fuel at the constant rotational speed of the engine and rail pressure, a gradient of the DP with respect to the crank angle immediately after the SOC is nearly constant irrespective of a change in such operating conditions. This means that a crank angle at which the DP immediately after the SOC is a constant pressure becomes a predetermined angle difference regardless of the SOC and combustion conditions.

Thus, the present invention is intended to estimate the SOC based on a DP value defined as a difference between an in-cylinder combustion pressure and a motoring pressure.

Therefore, in the present invention, a DP value defined as a difference pressure between the in-cylinder combustion pressure and the motoring pressure is first detected by using a cylinder pressure sensor.

For example, a crank angle ($CA_{DP10}$) is detected at a point where a corresponding detected DP value is 10 bar, and then the relationship between this variable and a detected delay angle ($\Delta CA_{DD}$) is established based on empirical data. Then, the Equation of capable of detecting the SOC is induced through a process of establishing the relationship between the engine speed and the detected delay angle.

Figure 3:
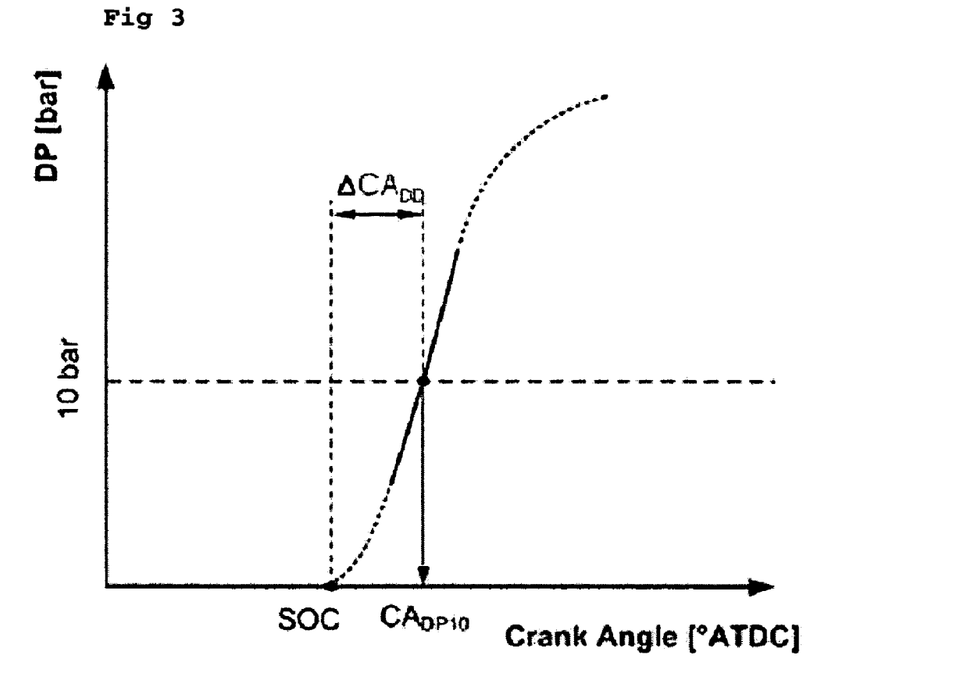
FIG. 3 is a diagrammatic graph illustrating a method of detecting the SOC according to the present invention.
Figure 4:
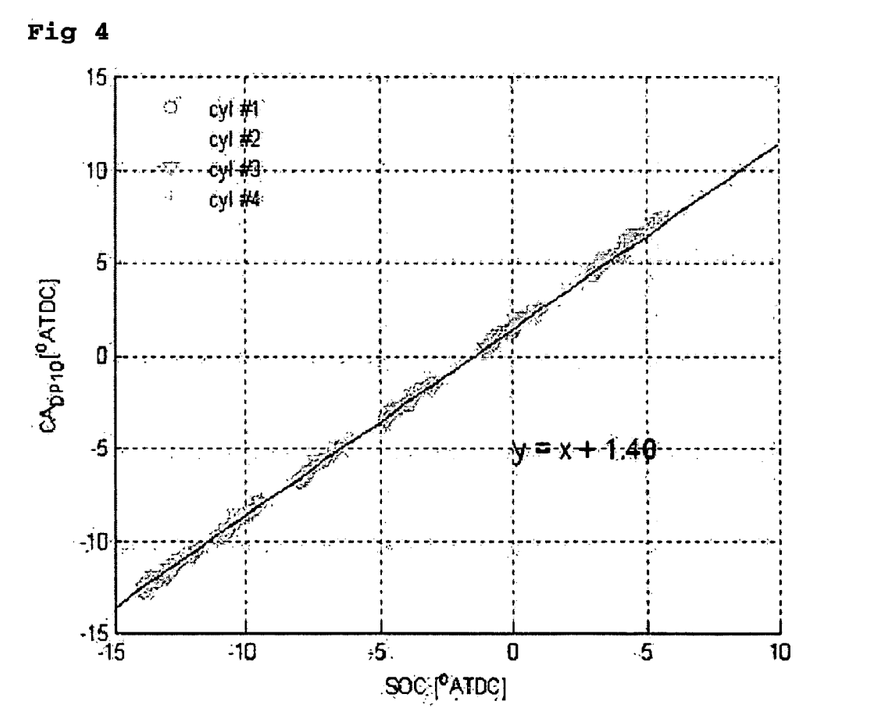
FIG. 4 is a graph illustrating the relationship between the SOC and the $CA_{DP10}$ at 1500 rpms.
Figure 5:
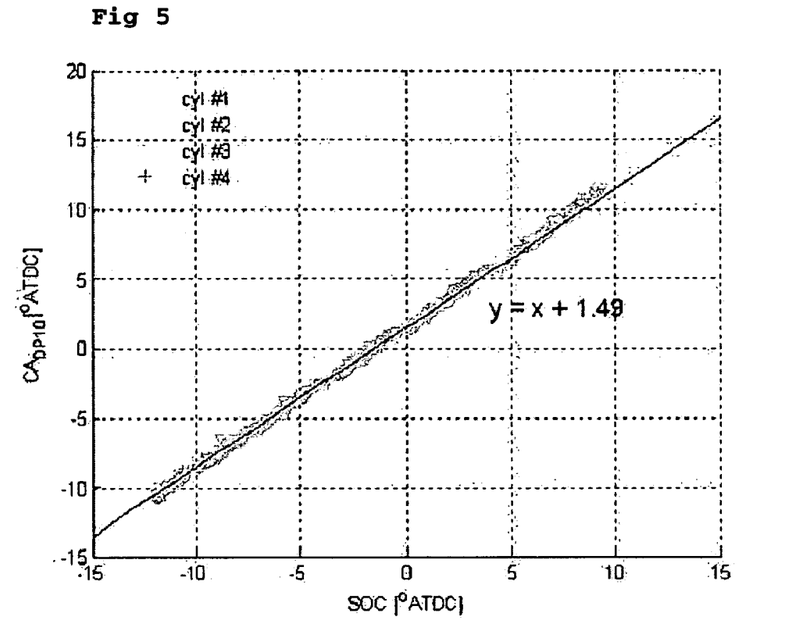
FIG. 5 is a graph illustrating the relationship between the SOC and the $CA_{DP10}$ at 2000 rpms.
Figure 6:
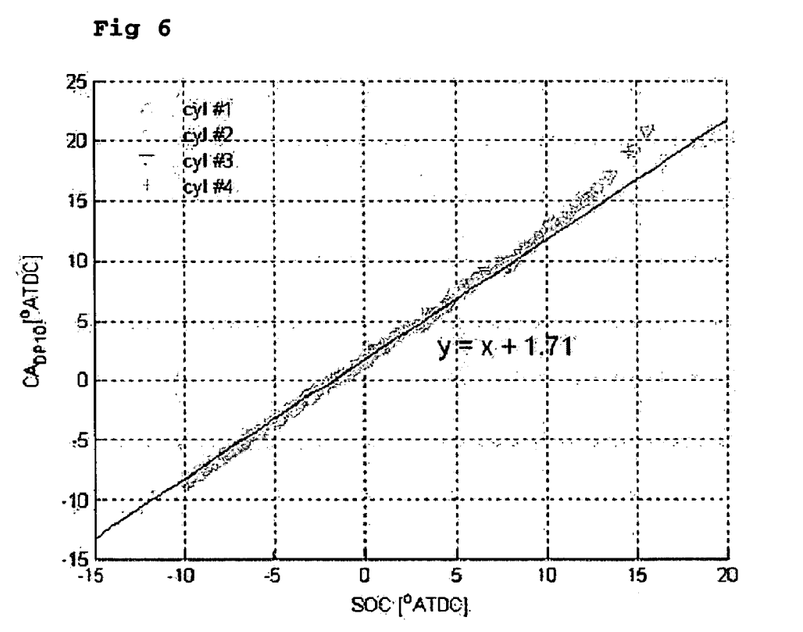
FIG. 6 is a graph illustrating the relationship between the SOC and the $CA_{DP10}$ at 2500 rpms.
Figure 7:
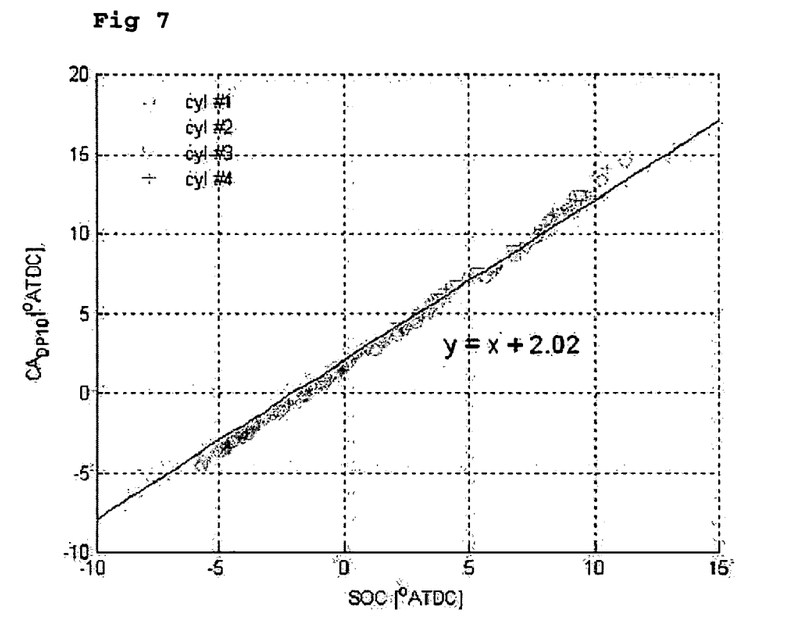
FIG. 7 is a graph illustrating the relationship between the SOC and the $CA_{DP10}$ at 3000 rpms.

FIG. 3 is a diagrammatic graph illustrating a method of detecting the SOC according to the present invention.

As shown in FIG. 3, a point where the DP value is 10 bar is $CA_{DP10}$, and the angle between the SOC and the $CA_{DP10}$ is defined as a detected delay angle ($\Delta CA_{DD}$).

Figure 9:
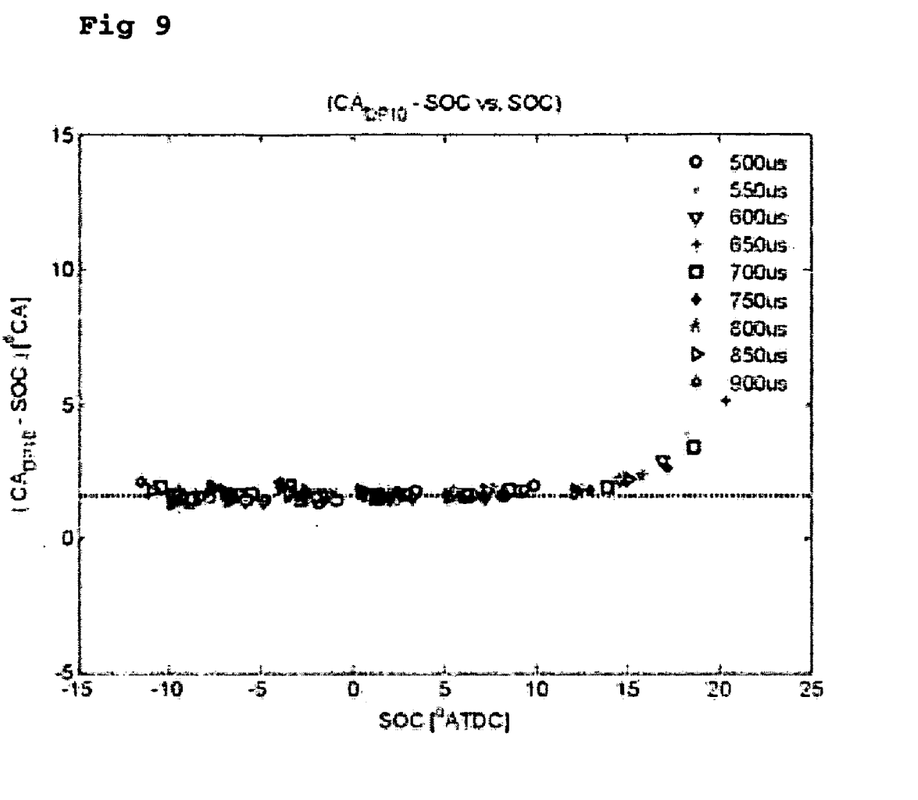
FIG. 9 is a graph illustrating the detected delay angle ($\Delta CA_{DD}$) with respect to 150 different operating conditions (injection time, SOE, and common rail pressure change) at 2000 rpms.

FIG. 9 is a graph illustrating the detected delay angle ($\Delta CA_{DD}$) with respect to 150 different operating conditions (injection time, SOE, and common rail pressure change) at 2000 rpms.

According to an experimental result, it can be seen that the detected delay angle is constant as 1.49° CA regardless of the common rail pressure, boost pressure, injected fuel amount. This result is represented by the following Equation (1):

$$SOC = CA_{DP10} - 1.49 [°ATDC] \quad (1)$$

The above detected delay angle can be regarded as being identical at a constant engine speed, and is represented by a function for the rotational speed of the engine.

The corresponding relationship between the SOC and $CA_{DP10}$ is a very distinct feature in the detection of the SOC. Furthermore, the SOC estimated from the $CA_{DP10}$ has a relatively low standard deviation as compared to the SOC calculated through the heat release analysis under a normal operating condition, and the $CA_{DP10}$ has a linear relation with the SOC at a constant engine speed but has no relation with other conditions except the SOC.

However, the angle difference between the SOC and the $CA_{DP10}$ has a close relation with the rotational speed of the engine.

In other words, the detected delay angle ($\Delta CA_{DD}$) has a fixed value at a constant engine speed, but has different values depending on a change in the rotational speed of the engine. Therefore, this relationship between the SOC and the $CA_{DP10}$ is represented as a general form with respect to the rotational speed of the engine by the following Equation (2):

$$SOC = CA_{DP10} - \Delta CA_{DD}(N) \quad (2)$$

where N denotes the revolution per minute (RPM) of the engine and $\Delta CA_{DD}$ denotes a detected delay angle.

FIGS. 4 to 7 are graphs illustrating the relationship between the SOC and the crank angle ($CA_{DP10}$) at different rotational speeds of the engine (1500, 2000, 2500 and 3000 rpms).

That is, in FIGS. 4 to 7 there are shown the results of measuring the SOC and $CA_{DP10}$ under more than 200 different steady state operating conditions depending on the fuel injection period, the SOE, the rail pressure change at each engine speed.

It can be seen from the graphs of FIGS. 4 to 7 that the relationship between the SOC and the crank angle ($CA_{DP10}$) has a nearly linear characteristic at a constant rotational speed of the engine.

The following Table 1 shows the statistical measures of the detected delay angle ($\Delta CA_{DD}$) values calculated from FIGS. 4 to 7.

TABLE 1

|  |  | 1500 rpms | 2000 rpms | 2500 rpms | 3000 rpms |
|---|---|---|---|---|---|
| Cyl #1 | Mean | 1.39 | 1.48 | 1.70 | 1.92 |
|  | Std | 0.12 | 0.16 | 0.28 | 0.42 |
| Cyl #2 | Mean | 1.37 | 1.47 | 1.68 | 1.99 |
|  | Std | 0.11 | 0.12 | 0.28 | 0.40 |
| Cyl #3 | Mean | 1.43 | 1.51 | 1.70 | 2.07 |
|  | Std | 0.12 | 0.13 | 0.27 | 0.43 |
| Cyl #4 | Mean | 1.40 | 1.51 | 1.76 | 2.10 |
|  | Std | 0.13 | 0.20 | 0.29 | 0.48 |
| Total | Mean | 1.40 | 1.49 | 1.71 | 2.02 |

According to the above Table 1, it can be seen that the detected delay angle ($\Delta CA_{DD}$) varies depending on the rotational speed of the engine, and a difference of $\Delta CA_{DD}$ between cylinders exists within the range of the standard deviation of the detected SOCs.

Figure 8:
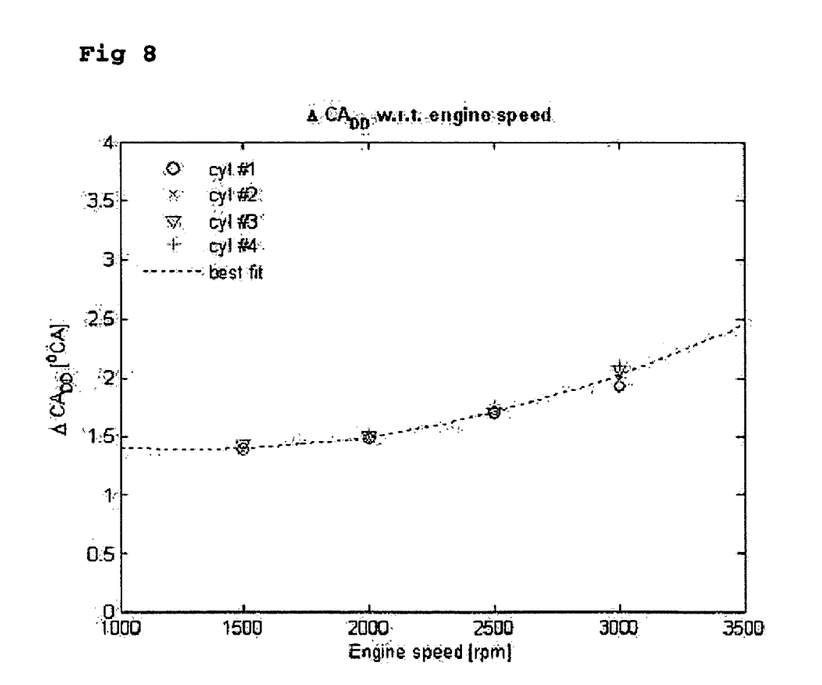
FIG. 8 is a graph illustrating a variation in a detected delay angle ($\Delta CA_{DD}$) according to a change in an engine speed (rpm)

Therefore, $\Delta CA_{DD}$ can be regarded as a function of the engine speed and the relationship between the $\Delta CA_{DD}$ and the engine rotational speed is indicated as shown in FIG. 8.

An appropriate approximation equation representative of four cylinders in FIG. 8 is represented by the following Equation (3):

$$\Delta CA_{DD}(N) = k_2 N^2 + k_1 N + k_0 \quad (3)$$

$k_2 = 0.2144[° CA/krpm^2]$
$k_1 = 0.5482[° CA/krpm]$
$k_0 = 1.7369[° CA]$ where N is the revolution per minute (unit is krmp and 1 krpm=1000 rpm) of the engine.

Resultantly, the SOC can be estimated by using the Equation (3) indicating the relationship between the engine speed and the $\Delta CA_{DD}$ as well as the above Equation (2). This means that the SOC can be estimated by using a difference between the combustion pressure and the motoring pressure under various operating conditions.

As apparent from the foregoing, the detection method of the start of combustion (SOC) in a diesel engine using an in-cylinder pressure of the present invention provides the following merits.

First, the use of SOC=$CA_{DPxx}$−$\Delta CA_{DD}$, i.e., the Equation induced according to the present invention enables more rapid and accurate estimation of the SOC than the use of the conventional SOC estimation method.

Second, the SOC is detected more simply and a response speed is sufficiently high enough to be applicable in real time, and the detected SOC can be applied to a feedback control system of the SOC so as to concurrently reduce the amount of HC and NOx emissions under all the operating conditions of the diesel engine, thereby addressing and solving various problems occurring due to cylinder-by-cylinder and cycle-by-cycle variations in the injection delay time and the ignition delay.

Third, an accurate start of combustion (SOC) can be estimated to improve the power of the diesel engine and provide a basis for satisfying the exhaust emission regulation.

Fourth, the inventive SOC estimation method enables the SOC to be estimated more rapidly and simply than the conventional SOC estimation method using the heat release analysis which is complicated and consumes much time, so that it can be widely used for a real-time SOC estimation in the diesel engine.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of detecting a start of combustion (SOC) in a diesel engine using an in-cylinder pressure, comprising the steps of:
   i) detecting a DP value defined as a difference pressure between an in-cylinder combustion pressure and a motoring pressure;
   ii) detecting a crank angle ($CA_{DPxx}$) at a point where the detected DP value is a specific pressure;
   iii) defining an angle difference between the start of combustion (SOC) and the crank angle ($CA_{DPxx}$) as a detected delay angle ($\Delta CA_{DD}$) and determining the detected delay angle ($\Delta CA_{DD}$) through an experiment of measuring the start of combustion (SOC) and the crank angle ($CA_{DPxx}$); and
   iv) detecting the SOC using the following Equation:

$$SOC = CA_{DPxx} - \Delta CA_{DD}.$$

2. The method as set forth in claim 1, wherein the detected delay angle ($\Delta CA_{DD}$) is defined as the following Equation:

$$\Delta CA_{DD}(N) = k_0 N^2 + k_1 N + k_2$$

where N is the revolution per minute of the engine, and $k_0$, $k_1$, and $k_2$ are arbitrary numbers for representing the relationship between N and $\Delta CA_{DD}$.

* * * * *